United States Patent
Liou et al.

(10) Patent No.: US 9,319,660 B2
(45) Date of Patent: Apr. 19, 2016

(54) DEVICE FOR ACQUIRING DEPTH IMAGE, CALIBRATING METHOD AND MEASURING METHOD THEREFOR

(71) Applicant: Industrial Technology Research Institute, Hsinchu (TW)

(72) Inventors: Tung-Fa Liou, Hsinchu (TW); Wen-Shiou Luo, Hsinchu (TW); Chia-Chen Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 364 days.

(21) Appl. No.: 13/871,000

(22) Filed: Apr. 26, 2013

(65) Prior Publication Data

US 2014/0184751 A1 Jul. 3, 2014

(30) Foreign Application Priority Data

Dec. 27, 2012 (TW) .............................. 101150634 A

(51) Int. Cl.
*H04N 13/00* (2006.01)
*H04N 15/00* (2006.01)
(Continued)

(52) U.S. Cl.
CPC .......... *H04N 13/0239* (2013.01); *G06T 7/0069* (2013.01); *H04N 13/0246* (2013.01);
(Continued)

(58) Field of Classification Search
CPC .......... H04N 13/0239; H04N 13/0242; H04N 13/0246; H04N 13/0296; H04N 13/021; H04N 13/0271; H04N 13/0253; H04N 2213/001; G06T 7/002; G06T 7/0018; G06T 2207/10012; G06T 2207/10028

USPC ......................................................... 348/47
See application file for complete search history.

(56) References Cited

U.S. PATENT DOCUMENTS 4,751,570 A * 6/1988 Robinson ........................ 348/47
4,999,713 A 3/1991 Ueno et al.
(Continued)

FOREIGN PATENT DOCUMENTS

CN 101581997 11/2009
CN 101833229 9/2010
(Continued)

OTHER PUBLICATIONS

Garcia et al., "Three-dimensional mapping and range measurement by means of projected speckle patterns", Applied Optics, Jun. 2008, vol. 47, p. 3032-p. 3040.
(Continued)

*Primary Examiner* — Michael Lee
(74) *Attorney, Agent, or Firm* — Jianq Chyun IP Office

(57) ABSTRACT

A device for acquiring depth image, a calibrating method and a measuring method therefore are provided. The device includes at least one projecting device, at least one image sensing device, a mechanism device and a processing unit. The projecting device projects a projection pattern to a measured object. The image sensing device is controlled to adjust a focal length and focus position, and therefore sense real images. The mechanism device adjusts a location and/or a convergence angle of the image sensing device. The processing unit calibrates the at least one image sensing device and generates a three dimension (3D) measuring parameter set at a model focal length according to a plurality of image setting parameter reference sets corresponding to a model focal length and a plurality of default node distances, respectively, and then estimates a depth map or depth information of the measured object.

35 Claims, 9 Drawing Sheets

(51) Int. Cl.
*H04N 13/02* (2006.01)
*G06T 7/00* (2006.01)

(52) U.S. Cl.
CPC .. *H04N13/0253* (2013.01); *G06T 2207/10012* (2013.01); *G06T 2207/10028* (2013.01); *H04N 13/0296* (2013.01); *H04N 2213/001* (2013.01)

(56) References Cited

U.S. PATENT DOCUMENTS

| | | | |
|---|---|---|---|
| 5,119,189 A * | 6/1992 | Iwamoto et al. | 348/47 |
| 5,175,616 A * | 12/1992 | Milgram et al. | 348/47 |
| 5,699,108 A * | 12/1997 | Katayama et al. | 348/47 |
| 5,949,477 A * | 9/1999 | Hoglin | 348/47 |
| 5,978,015 A * | 11/1999 | Ishibashi et al. | 348/47 |
| 6,177,952 B1 * | 1/2001 | Tabata et al. | 348/47 |
| 6,414,709 B1 * | 7/2002 | Palm et al. | 348/47 |
| 6,701,081 B1 | 3/2004 | Dwyer et al. | |
| 6,915,008 B2 * | 7/2005 | Barman et al. | 382/154 |
| 7,103,212 B2 * | 9/2006 | Hager et al. | 382/154 |
| 8,085,293 B2 * | 12/2011 | Brodsky et al. | 348/49 |
| 2005/0225884 A1 | 10/2005 | Gim et al. | |
| 2007/0018977 A1 | 1/2007 | Niem et al. | |
| 2011/0149031 A1 | 6/2011 | Um et al. | |
| 2011/0298899 A1 * | 12/2011 | Masuda | 348/47 |
| 2012/0218387 A1 * | 8/2012 | Aoki et al. | 348/47 |
| 2012/0249748 A1 * | 10/2012 | Nagano | 348/47 |

FOREIGN PATENT DOCUMENTS

| | | |
|---|---|---|
| CN | 102708570 | 10/2012 |
| CN | 102760234 | 10/2012 |
| JP | H04108288 | 4/1992 |
| JP | 4764959 | 9/2011 |
| KR | 20100080704 | 7/2010 |
| TW | I297803 | 6/2008 |
| TW | 201120410 | 6/2011 |
| TW | 201205181 | 2/2012 |
| TW | 201236439 | 9/2012 |
| TW | 201241547 | 10/2012 |
| TW | 201250628 | 12/2012 |
| WO | 02073980 | 9/2002 |

OTHER PUBLICATIONS

Nguyen et al., "Multiple-view Shape and Deformation Measurement by Combining Fringe Projection and Digital Image Correlation", Strain: An International Journal for Experimental Mechanics, Jun. 2012, vol. 48, p. 256-p. 266.

Yang et al., "Multi-Resolution Real-Time Stereo on Commodity Graphics Hardware", 2003 IEEE Computer Society Conference on Computer Vision and Pattern Recognition, Jun. 2003, vol. 1, p. I-211-p. 1-217.

Chen et al., "Range data acquisition using color structured lighting and stereo vision", Image and Vision Computing, Nov. 1996, vol. 15, p. 445-p. 456.

Heinzle et al., "Computational Stereo Camera System with Programmable Control Loop", ACM Transactions on Graphics (TOG)—Proceedings of ACM SIGGRAPH 2011, Jul. 2011, vol. 30, p. 94:1-p. 94:10.

"Office Action of Taiwan Counterpart Application", issued on Dec. 30, 2014, p. 1-p. 3.

"Office Action of China Counterpart Application", issued on Sep. 25, 2015, p. 1-p. 5.

* cited by examiner

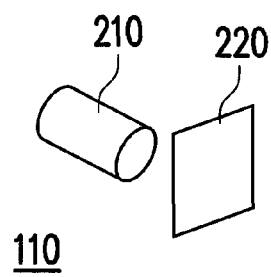
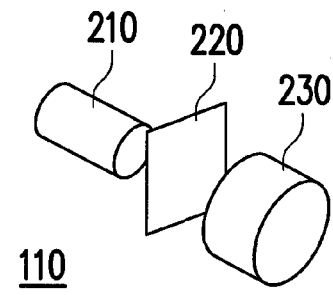
FIG. 2A  FIG. 2B
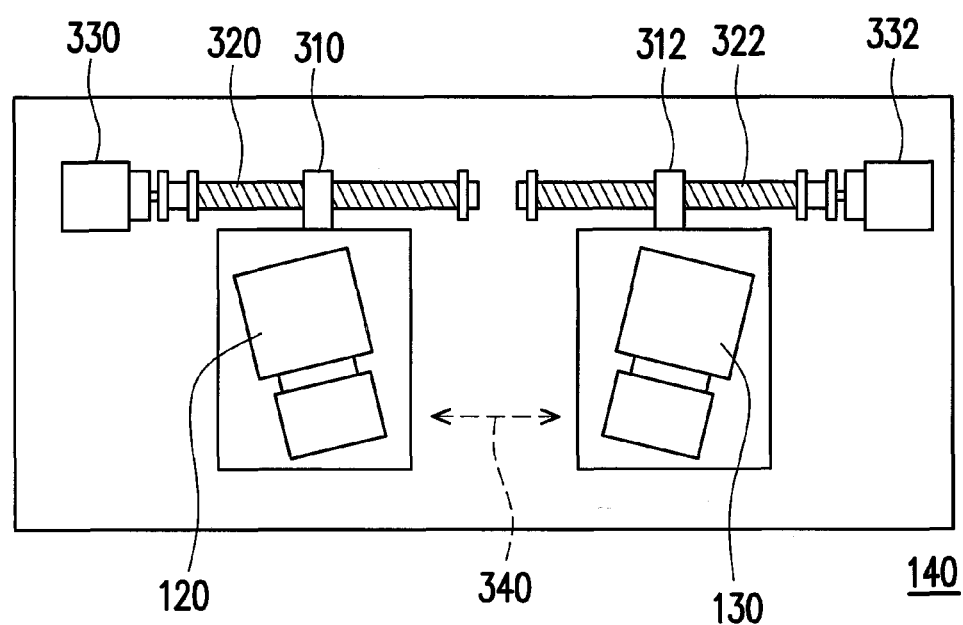
FIG. 3

DEVICE FOR ACQUIRING DEPTH IMAGE, CALIBRATING METHOD AND MEASURING METHOD THEREFOR

CROSS-REFERENCE TO RELATED APPLICATION

This application claims the priority benefit of Taiwan application serial no. 101150634, filed on Dec. 27, 2012. The entirety of the above-mentioned patent application is hereby incorporated by reference herein and made a part of this specification.

BACKGROUND

1. Technical Field

The disclosure relates to a technique for acquiring depth image. Particularly, the disclosure relates to a zoom type depth image acquiring device, a calibrating method and a measuring method thereof.

2. Related Art

Today's image sensing technology becomes more mature. Besides obtaining two-dimensional (2D) images, how to effectively, opportunely and stably obtain 3D (i.e. depth) information of an object to be tested becomes an important issue in depth image sensing technology. Since the depth image sensing technology can estimate a distance between an image acquiring device and the object to be tested, integral 3D space information can be provided, which can be used in interfaces of an interactive browsing device and somatosensory games, and is also gradually applied in security video surveillance, robot vision, and medical imaging. A somatosensory game device, Kinect, is published by Microsoft uses the depth image sensing technology as a core element, such that human motions can serve as an media control interface of the game, which causes sales booming of the device, and more manufacturers pay attentions to the depth image sensing technology and applications thereof.

An image acquiring device (for example, a depth camera) using the depth image sensing technology is generally implemented by using prime lens since related image acquiring parameters can be easily calibrated in advance. However, range of viewing angle (which is also referred to as a sensing range) and image resolution of depth camera adopting prime lens are also fixed. Therefore, if the object to be tested is too large and exceeds the viewing angle range, a position of the fixed focal length depth cameral is required to be manually adjusted. If the size of the object to be adjusted is too small to cause blurriness of the acquired image (i.e. the image resolution is too small), depth sensing performed through the acquired image could not be implemented. However, if zoom lens are used in the implementation of the depth camera, the issue of setting and adjusting focal lengths of the zoom lens is a problem to be solved in the calibration of the depth camera in the recent depth image sensing technology.

SUMMARY

The disclosure is directed to a depth image acquiring device, in which at least one zoom type image sensing device and at least one projecting device are used to perform depth image measurement of active light projection, and a mechanism device is used to dynamically adjust distances and/or convergence angles between the image sensing devices, so as to automatically adjust locations and/or convergence angles of the zoom type image sensing devices, such that the depth image acquiring device of the disclosure is capable of automatically adjusting an image acquiring range thereof and adjusting a resolution of an acquired image.

An embodiment of the disclosure provides a depth image acquiring device including at least one projecting device, a first and a second image sensing devices, a mechanism device and a processing unit. The projecting device projects a projection pattern to a measured object. The first and the second image sensing devices receive focal length adjusting signals to adjust focal lengths thereof, and respectively sense the projection pattern projected to the measured object to generate a first real image and a second real image. The mechanism device is coupled to the first and the second image sensing devices, and receives lens adjusting signals to adjust locations and/or convergence angles of the first and the second image sensing devices. The processing unit is coupled to the projecting device, the first and the second image sensing devices and the mechanism device. The processing unit provides the focal length adjusting signals and the lens adjusting signals to adjust focal lengths, locations and/or convergence angles of the first and the second image sensing devices, and the processing unit performs a depth operation on the first and the second real images to generate depth information, where the processing unit calibrates and obtains a three-dimensional (3D) measuring parameter set of the first and the second image sensing devices at a model focal length according to a plurality of image setting parameter sets corresponding to the model focal length and a plurality of predetermined node distances corresponding to each of the image sensing devices, and accordingly performs the depth operation.

An embodiment of the disclosure provides a depth image acquiring device including at least one projecting device, at least one image sensing device, a mechanism device and a processing unit. The projecting device projects a projection pattern to a measured object. The projecting device serves as a virtual image sensing device, and an original image of the projection pattern is taken as a virtual image. The at least one image sensing device receives a focal length adjusting signal to adjust a focal length thereof, and senses the projection pattern projected to the measured object to generate at least one real image. The mechanism device is coupled to the at least one image sensing device, and receives a lens adjusting signal to adjust a location and/or a convergence angle of the at least one image sensing device. The processing unit is coupled to the projecting device, the at least one image sensing device and the mechanism device. The processing unit provides the focal length adjusting signal and the lens adjusting signal to adjust the focal length, the location and/or the convergence angle of the at least one image sensing device, and the processing unit performs a depth operation on the at least one real image and the virtual image to generate depth information. The processing unit calibrates and obtains a three dimension (3D) measuring parameter set of the at least one image sensing device at a model focal length according to a plurality of image setting parameter sets corresponding to a model focal length and a plurality of predetermined node distances corresponding to each of the image sensing devices, and accordingly performs the depth operation.

An embodiment of the disclosure provides a calibrating method of a depth image acquiring device, where the depth image acquiring device includes at least one projecting device, at least one image sensing device and a mechanism device. The at least one projecting device projects a projection pattern to a measured object. The at least one image sensing device senses the projection pattern projected to the measured object to generate at least one real image. The mechanism device adjusts a location and/or a convergence angle of the at least one image sensing device. The depth image acquiring device performs a depth operation on the at least one real image to generate depth information. The calibrating method includes following steps. A plurality of node distances are set to serve as locations of a plurality of nodes. An image setting parameter set corresponding to each of the nodes is set. The at least one image sensing device is set to a respective focal length. A state of the at least one image sensing device is set according to the image setting parameter set of each of the nodes. Each of the nodes is calibrated to obtain a 3D measuring parameter set of each of the nodes, so as to perform a 3D measuring calculation.

An embodiment of the disclosure provides a measuring method of a depth image acquiring device, where the depth image acquiring device includes a projecting device, at least one image sensing device and a mechanism device. The projecting device projects a projection pattern to a measured object. The at least one image sensing device senses the projection pattern projected to the measured object to generate at least one real image. The mechanism device adjusts a location and/or a convergence angle of the at least one image sensing device. The depth image acquiring device performs a depth operation on the at least one real image to generate depth information. The measuring method includes following steps. A specific focal length and a specific measuring distance are received, where the at least one image sensing device is set to have a model focal length, a plurality of node distances corresponding to locations of a plurality of nodes, an image setting parameter set and a 3D measuring parameter set corresponding to each of the nodes. The specified measuring distance is compared with the corresponding node distances to calculate the image setting parameter set and the 3D measuring parameter set of the image sensing device at the specified focal length. A state of the image sensing device is set according to the image setting parameter set of the specified focal length, where the image sensing device senses the projection pattern projected to the measured object to generate the at least one real image. An image conversion equation is calculated according to the specified focal length and the model focal length. Moreover, the real image is converted according to the image conversion equation, and calculation is performed according to the 3D measuring parameter set of the specified focal length to generate the depth information.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2A and FIG. 2B are functional block diagrams of the projecting device of FIG. 1.

FIG. 3 to FIG. 7 are structural schematic diagrams of the mechanism device of FIG. 1.

DETAILED DESCRIPTION OF DISCLOSED EMBODIMENTS

Figure 1:
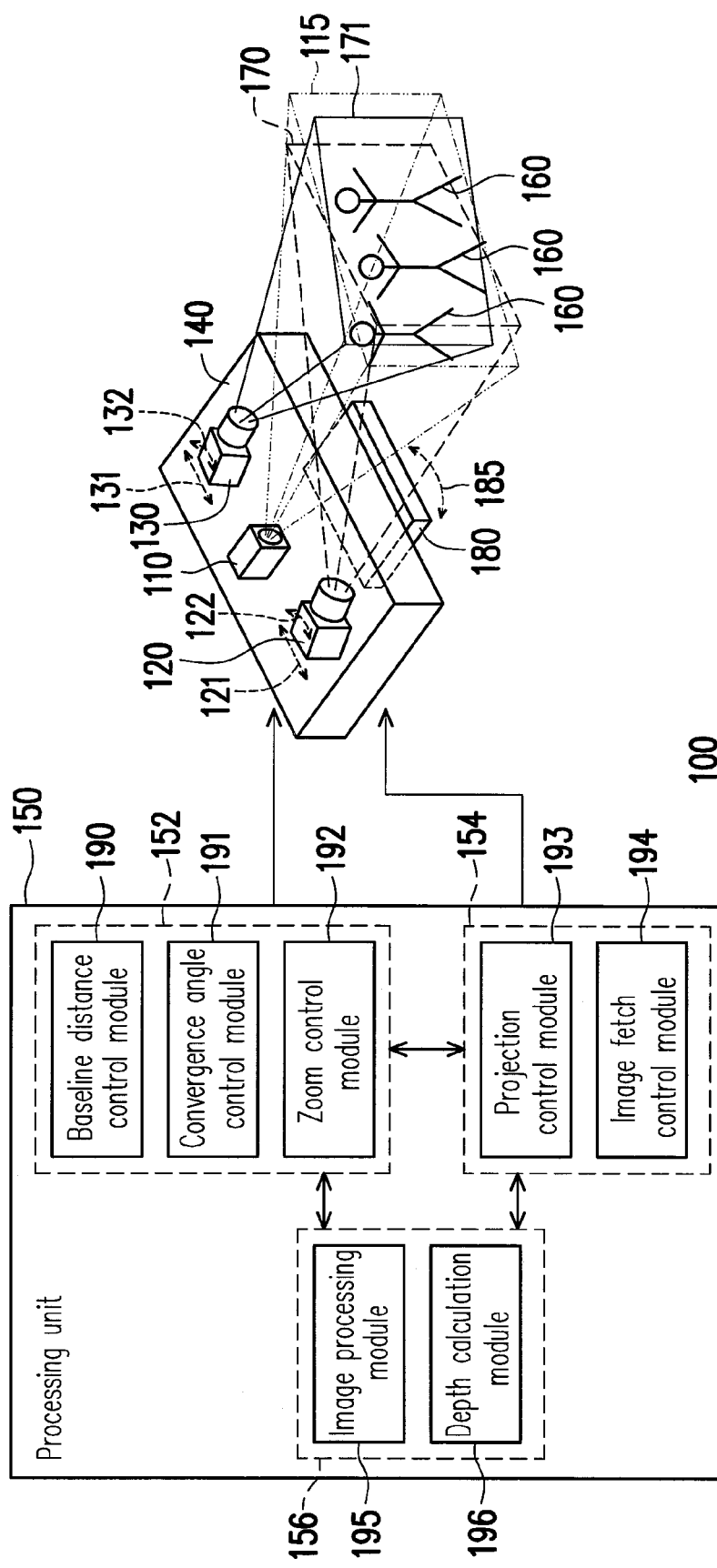
FIG. 1 is a schematic diagram of a depth image acquiring device according to an embodiment of the disclosure.

Reference will now be made in detail to the present exemplary embodiments of the disclosure, examples of which are illustrated in the accompanying drawings. Wherever possible, the same reference numbers are used in the drawings and the description to refer to the same or like parts.

A depth image acquiring device of the disclosure can perform depth image measurement of a large viewing angle range without changing a hardware structure, and can perform a high-resolution detail measurement on a partial region of a measured object. When the detailed measurement is performed, a distance of the measuring position is freely specified, and accuracy of the acquired image is maintained, so as to improve accuracy in detail measurement of a general fixed focal length depth image measuring technique.

Therefore, in the disclosure, at least one zoom type image sensing device is used to implement the depth image acquiring device, such that a large viewing angle range can be measured in case of a short focal length, and in case of the detail measurement, a long focal length is used to obtain a high-resolution image to perform the depth measurement. The depth image acquiring device can also dynamically adjust a baseline distance and/or a convergence angle between two image sensing devices or between the image sensing device and a projecting device, so as to change a convergence point distance and a lens focusing distance of an optical axis of the lens of the image sensing device to adjust a distance of the object to be tested. The convergence angle refers to an included angle between the optical axis of the image sensing device and a baseline, and the baseline is an imaginary line passing through a position of the image sensing device. A direction of the baseline is generally perpendicular to a light projection axis of a projecting device. The "convergence angles" referred in the following embodiments are all complied with the above definition. Embodiments are provided below to describe the disclosure in detail, those skilled in the art can deduce related practices according to the provided embodiments, and the disclosure is not limited to the provided embodiments.

FIG. 1 is a schematic diagram of a depth image acquiring device 100 according to an embodiment of the disclosure. As shown in FIG. 1, the depth image acquiring device 100 mainly includes at least one projecting device 110, at least one image sensing device (for example, a first image sensing device 120 and a second image sensing device 130), a mechanism device 140 and a processing unit 150. The projecting device 110 is, for example, an optical projecting device, a digital projecting device, etc., which can project a projection pattern 115 to a measured object 160. In the present embodiment, the single projecting device 110 is taken as an example for descriptions, though those skilled in the art can use a plurality of projecting devices to implement the depth image sensing of active light projection, which is not limited by the disclosure.

In the present embodiment, the image sensing devices 120 and 130 can be zoom type video cameras or zoom type cameras, which receive focal length adjusting signals provided by the processing unit 150 to adjust focal lengths thereof, and respectively sense the projection pattern 115 projected to the measured object 160 to generate a first real image 170 and a second real image 171. In detail, the first and the second image sensing devices 120 and 130 may respectively include a zoom lens and an image sensor. The zoom lens may receive the focal length adjusting signal provided by the processing unit 150 to adjust the focal length thereof. The image sensor senses the projection pattern projected to the measured object 160 through the zoom lens. Moreover, in the disclosure, the image sensing devices 120 and 130 are not limited to have a same focal length range and convergence angle rotating range, and those skilled in the art can also select the image sensing devices 120 and 130 with different focal length ranges and different convergence angle rotating ranges to implement the disclosure.

When a light source of the projecting device 110 belongs to a light source with a specific wavelength (for example, an infrared light, an ultraviolet light, or a specific visible light), the first and the second image sensing devices 120 and 130 may also include an optical filter, respectively. The optical filters are respectively disposed on optical paths of the respective zoom lens of the image sensing devices 120 and 130. The optical filter is used to match the specific wavelength, such that the light with the above specific wavelength can pass through the optical filter and is detected by a lens and the image sensor, and the light with a wavelength other than the specific wavelength is filtered. When a plurality of projecting devices have different specific wavelengths, the optical filters of the image sensors can also match the different specific wavelengths for separation.

According to a depth image sensing technique, the processing unit 150 generally requires two image sensing devices to sense the depth of the measured object 160. However, since the active light projection is applied to perform the depth sensing, and the projecting device 110 can also serve as a virtual image sensing device, namely, the projecting device 110 can also record an original image of the projected projection pattern 115 to serve as a virtual image, and transmits the virtual image to the processing unit 150. The processing unit 150 can perform the depth image sensing according to the real image acquired by the single image sensing device and the virtual image provided by the aforementioned virtual image sensing device. Therefore, in the embodiment of the disclosure, a single image sensing device can be used in collaboration with a single projecting device to perform the depth measurement, and more than two image sensing devices can be used to perform the depth measurement according to the projection pattern projected by the projecting device.

Referring to FIG. 1, the mechanism device 140 is mainly coupled to the first and the second sensing devices 120 and 130 through a mechanical manner. The mechanism device 140 receives a lens adjusting signal provided by the processing unit 150, and adjusts a relative position of the first and the second image sensing devices 120 and 130 through an internal motor or related transmission assembly (shown by dot line arrows 121 and 131), and/or adjusts convergence angels of the lenses in the first and the second image sensing devices 120 and 130 that point towards the measured object (shown by dot line arrows 122 and 132). The mechanism device 140 can only adjust the relative position of the first and the second image sensing devices 120 and 130 without adjusting the convergence angles to save a cost of the rotating mechanism, or can only adjust the convergence angles of the first and the second image sensing devices 120 and 130 without adjusting the relative position (the baseline distance) thereof to decrease a whole size of the depth image acquiring device 100. Certainly, the mechanism device 140 can also simultaneously adjust both of the above two parameters. A detailed structure of the mechanism device 140 is disclosed below.

The processing unit 150 is coupled to at least one projecting device 110, the at least one image sensing device (the first and the second image sensing devices 120 and 130) and the mechanism device 140. The processing unit 150 provides the focal length adjusting signals and the lens adjusting signals according to a following calibration method and measuring method, so as to respectively adjust the focal lengths, positions and convergence angles of the first and the second image sensing devices 120 and 130. Moreover, the processing unit 150 controls the first and the second image sensing devices 120 and 130 to simultaneously obtain the real images, for example, the first real image 170 and the second real image 171, and the processing unit 150 perform a depth operation on the first and the second real images 170 and 171 to generate depth information. If the projecting device 110 serves as the virtual image sensing device, the processing unit 150 can perform the depth operation on the first and the second real images 170 and 171 and the virtual image corresponding to the projection pattern 115.

The depth information can be a depth image with depth information, digital 3D image coordinates or a depth distribution map of image, and those skilled in the art can adjust an output format of the depth information for utilization of subsequent image processing or technical application according to an actual requirement. Moreover, the processing unit 150 respectively sets a predetermined model focal length for each of the image sensing devices (for example, the image sensing devices 120 and 130) according to the following calibration method, and builds a plurality of image setting parameter sets under the model focal length corresponds to a plurality of predetermined node distances, and calibrates the first and the second image sensing devices 120 and 130 according to the image setting parameter sets to obtain a 3D measuring parameter set, and in case of a specified focal length and a specified measurement distance, the corresponding image setting parameter set is calculated to set a measurement state of the image sensing device, so as to perform the depth image measurement.

In FIG. 1, the depth image acquiring device 100 may further include a rotating device 180 disposed at a base below, and the rotating device 180 is controlled by the processing unit 150 to rotate the whole depth image acquiring device 100, so as to adjust a viewing angle direction thereof (shown as a dot line arrow 185). The rotating device 180 can horizontally rotate the depth image acquiring device 100 or tilt the same back and forth, or conduct both to automatically adjust a viewing angle range of the depth image acquiring device 100.

Various components of the depth image acquiring device 100 and a calibrating method and a measuring method thereof are described in detail below.

The projecting device 110 is described with reference of FIG. 2A and FIG. 2B, FIG. 2A and FIG. 2B are functional block diagrams of the projecting device 110 of FIG. 1. Referring to FIG. 2A, the projecting device 110 includes a light source 210 and a projection pattern generation device 220. The light source 210 is used to emit a projection beam, and the light source 210 of the present embodiment can be a laser diode (LD) light source, an infrared (IR) light source, an ultraviolet light source, a visible light source or a light emitting diode (LED) light source. The projection pattern generation device 220 is disposed on a transmission path (which is also referred to as an optical path) of the projection beam sent by the light source 210. The projection pattern generation device 220 produces the projection pattern when it is irradiated by the projection beam of the light source 210. The projection pattern generation device 220 can be a diffractive optical device with a default shape, for example, one of a computer hologram, a grating and a phase diffractive optical device. The projection pattern generation device 220 can also be a device formed by frosted glass, and the projecting device 110 can project the projection beam onto the frosted glass to form a random distribution pattern. The projection pattern can be a pre-designed pattern, a randomly generated pattern, or a randomly distributed stray light spot pattern.

Referring to FIG. 2B, besides the light source 210 and the projection pattern generation device 220, the projecting device 110 may further include a projecting lens 230. The projecting lens 230 is disposed on an optical path behind the projection pattern generation device 220, and projects the projection pattern generated by the light source 210 through the projection pattern generation device 220 to the measured object 160. The projecting lens 230 of the present embodiment can be a zoom lens or a fixed focal length lens. If the projecting lens 230 is implemented by the fixed focal length lens, the projecting device 110 can project the projection pattern through a fixed angle or a fixed viewing angle range, and now the projection pattern is probably required to use fine light spots such that the depth image acquiring device 100 may obtain a better effect in detail measurement. The projecting lens 230 of the present embodiment can also be implemented by a zoom lens, and the processing unit 150 can provide the focal length adjusting signals to synchronously and dynamically adjust the focal lengths of the projecting lens 230 and the image sensing devices (the first and the second image sensing devices 120 and 130), so as to obtain more accurate depth information through the active light projection. Configuration and actuation methods of the projecting device 110 and the aforementioned virtual image sensing device may additionally refer to related patents, for example, Taiwan Patent Application No. TW100148939 (Publication No.: 201241547) with patent name of "system, device and method for acquiring depth image".

Figure 4:
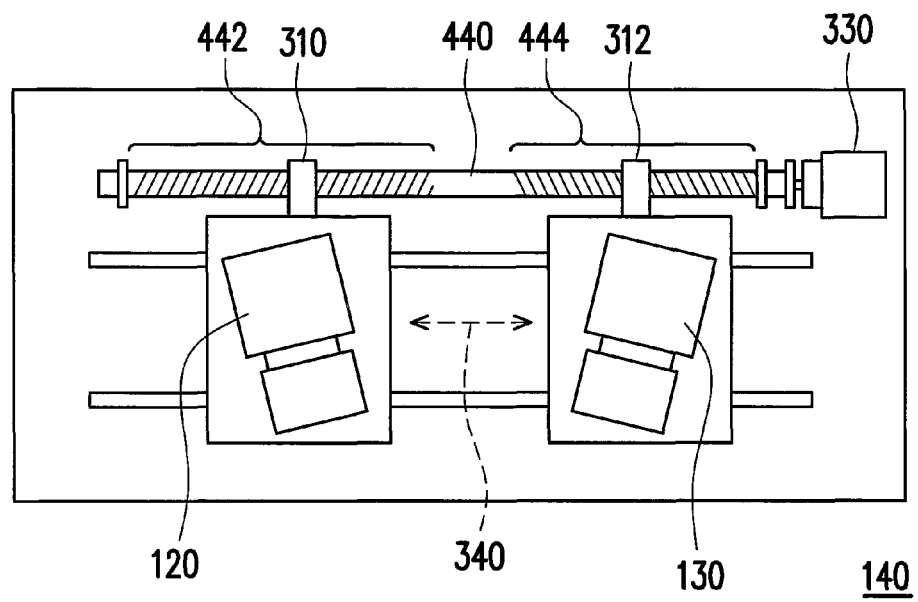

FIG. 3 to FIG. 7 are structural schematic diagrams of the mechanism device 140 of FIG. 1. The mechanism device 140 of the present embodiment may use a plurality of mechanism components to adjust the baseline distances and the convergence angles of the first and the second image sensing devices 120 and 130, so as to adjust convergence distances (which are also referred to as measuring positions) of the lenses of the first and the second image sensing devices 120 and 130. As shown in FIG. 3, the mechanism device 140 includes a first and second carrying members 310 and 312 and shifting members (for example, a first and a second screws 320 and 322). The first and second carrying members 310 and 312 respectively carry the first and the second image sensing devices 120 and 130, and are respectively connected to the first and second screws 320 and 322. The shifting members are connected to the first and the second carrying members 310 and 312 to adjust the baseline distances of the first and second image sensing devices 120 and 130. In detail, the first and the second screws 320 and 322 respectively drive the first and the second carrying members 310 and 312 through rotations of motors 330 and 332, and the first and the second carrying members 310 and 312 respectively move to the left and right (shown as a dot line arrow 340) along the first and the second screws 320 and 322, so as to adjust the base line position between the first and second image sensing devices 120 and 130. In FIG. 4, besides the first and the second carrying members 310 and 312, the shifting member further includes a screw 440, and the screw 440 includes a first region 442 and a second region 444 respectively having threads of a first direction and a second direction. The first region 442 and the second region 444 of the screw 440 are respectively connected to the first and the second carrying members 310 and 312. In this way, when the screw 440 rotates as the motor 330 rotates, the first and the second carrying members 310 and 312 move relative to each other, for example, approach to each other or depart from each other along the screw 440 (shown as the dot line arrow 340). FIG. 8 is a schematic diagram of adjusting baseline distances between the first and the second image sensing devices 120 and 130 to adjust a measuring position of the depth image acquiring device 100. Therefore, after the depth image acquiring device 100 uses the mechanism device 140 of FIG. 3 and FIG. 4, the baseline distances (for example, BL1-BLN in FIG. 8) between the first and the second image sensing devices 120 and 130 can be adjusted as that shown in FIG. 8, and in case that the convergence angle A1 of the first and the second image sensing devices 120 and 130 remains fixed, the mechanism device 140 can receive the lens adjusting signals provided by the processing unit to adjust the measuring position (for example, a plurality of measuring nodes N1-NN in FIG. 8) to be measured by the depth image acquiring device 100.

Figure 5:
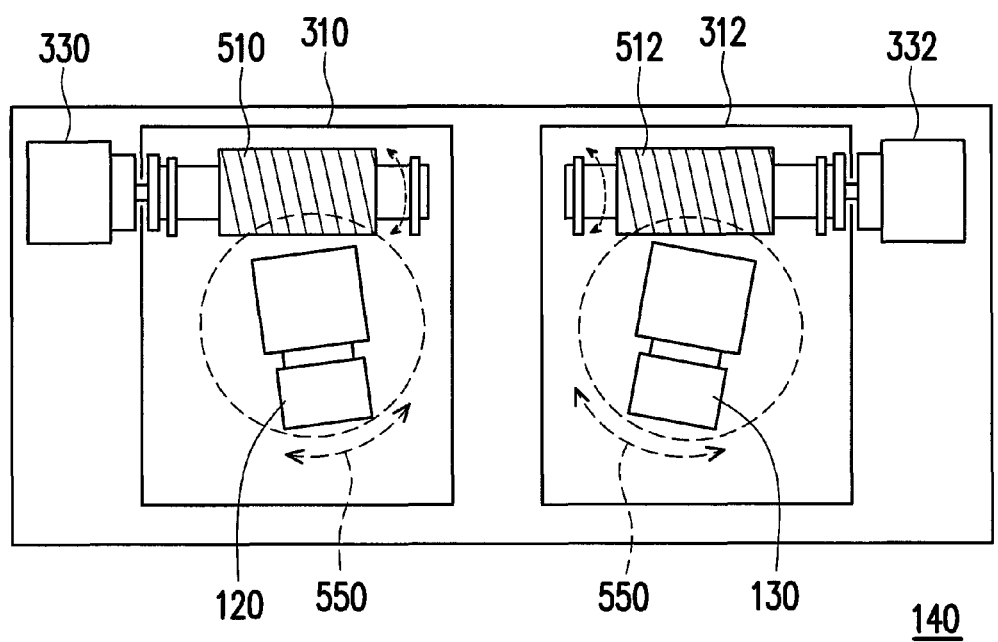
Figure 6:
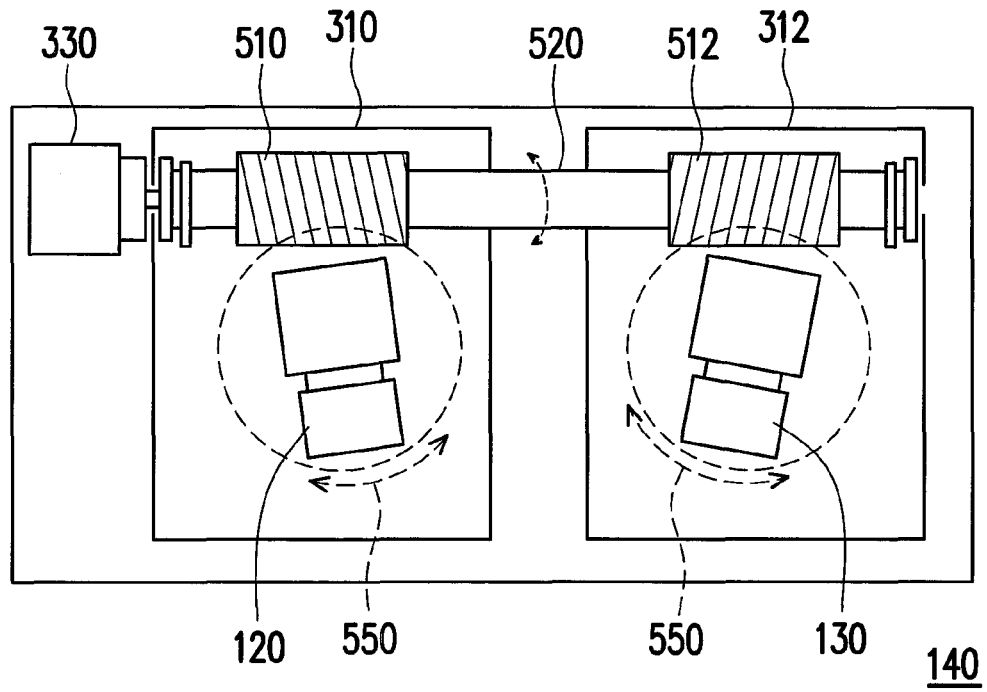
Figure 9:
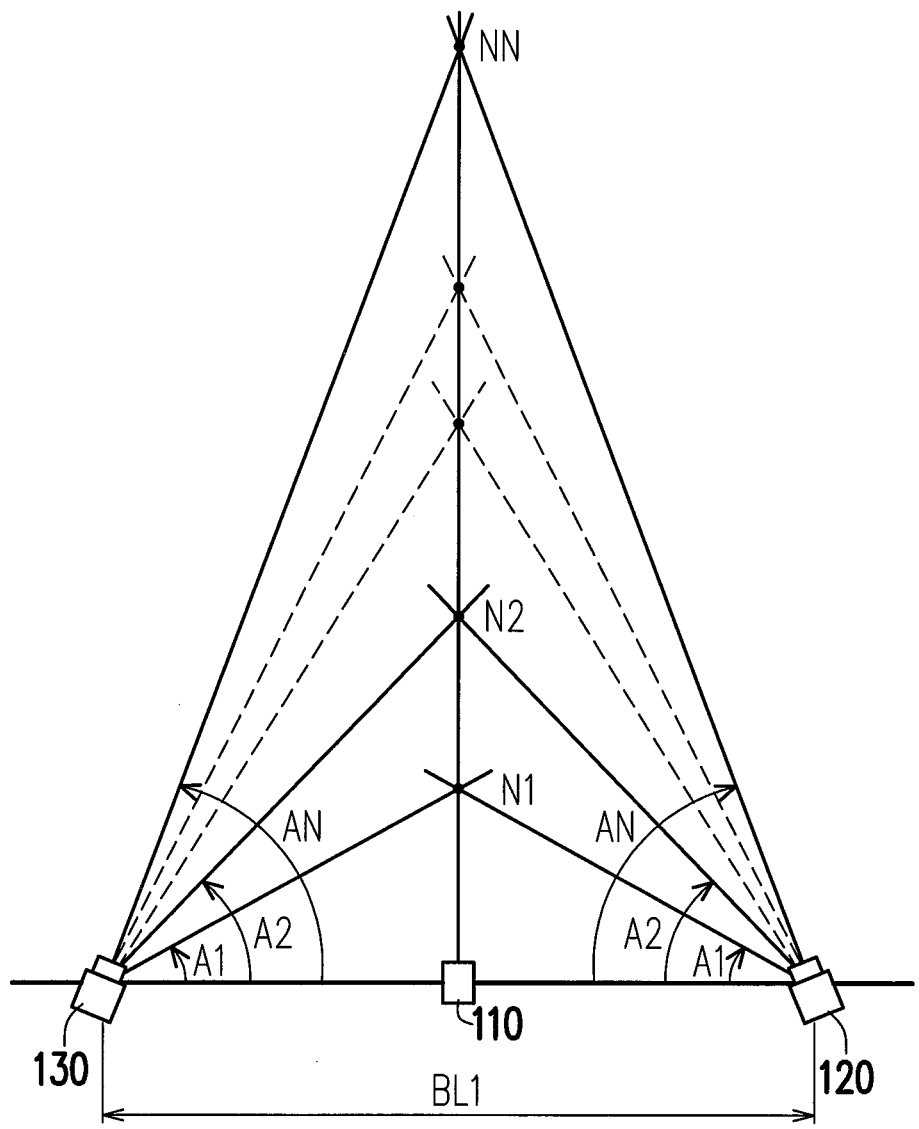
FIG. 9 is a schematic diagram of adjusting convergence angles of a first and a second image sensing devices to adjust a measuring position of the depth image acquiring device.

The mechanism devices 140 in FIG. 3 and FIG. 4 are all used to adjust the baseline distances between the first and the second image sensing devices 120 and 130, and the mechanism devices 140 in FIG. 5 and FIG. 6 are used to adjust the convergence angle between the first and the second image sensing devices 120 and 130. In FIG. 5, besides the first and the second carrying members 310 and 312, the mechanism device 140 further includes a first and second rotating components 510 and 512, which can drive the first and the second image sensing device 120 and 130 to rotate along with rotation of the motors 330 and 332, so as to respectively adjust the convergence angles of the first and the second image sensing devices 120 and 130 (shown in dot line arrows 550). The first and the second rotating components 510 and 512 are, for example, worms and worm gear components or other rotation transmission components. In FIG. 6, the first and the second rotating components 510 and 512 have a same rotation shaft 520, and the rotation shaft 520 has threads of the first direction and the second direction, such that rotation directions of the driven image sensing devices are opposite. Therefore, the first and the second rotating components 510 and 512 can simultaneously adjust the convergence angles of the first and the second image sensing devices 120 and 130 through rotation of the single motor 330. FIG. 9 is a schematic diagram of adjusting convergence angles of the first and the second image sensing devices 120 and 130 to adjust a measuring position of the depth image acquiring device 100. Therefore, after the depth image acquiring device 100 uses the mechanism device 140 of FIG. 5 and FIG. 6, the convergence angles A1-AN of the first and the second image sensing devices 120 and 130 can be adjusted as that shown in FIG. 9, and in case that the baseline distance BL1 between the first and the second image sensing devices 120 and 130 remains fixed, the mechanism device 140 can receive the lens adjusting signals provided by the processing unit to adjust the measuring position (for example, a plurality of measuring nodes N1-NN in FIG. 9) to be measured by the depth image acquiring device 100.

Figure 7:
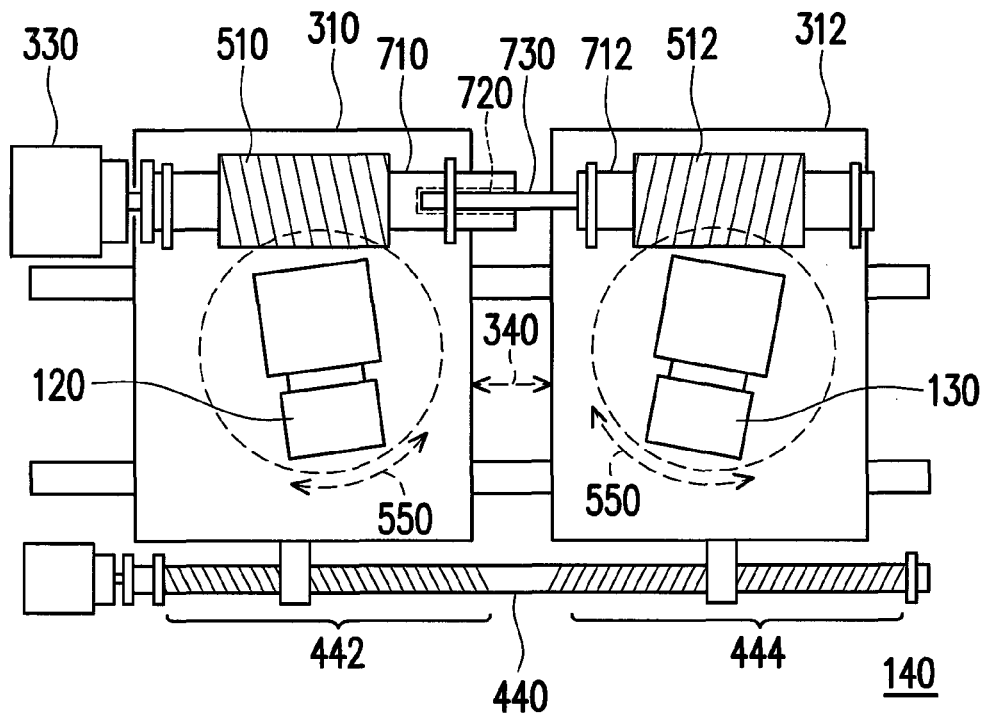
Figure 8:
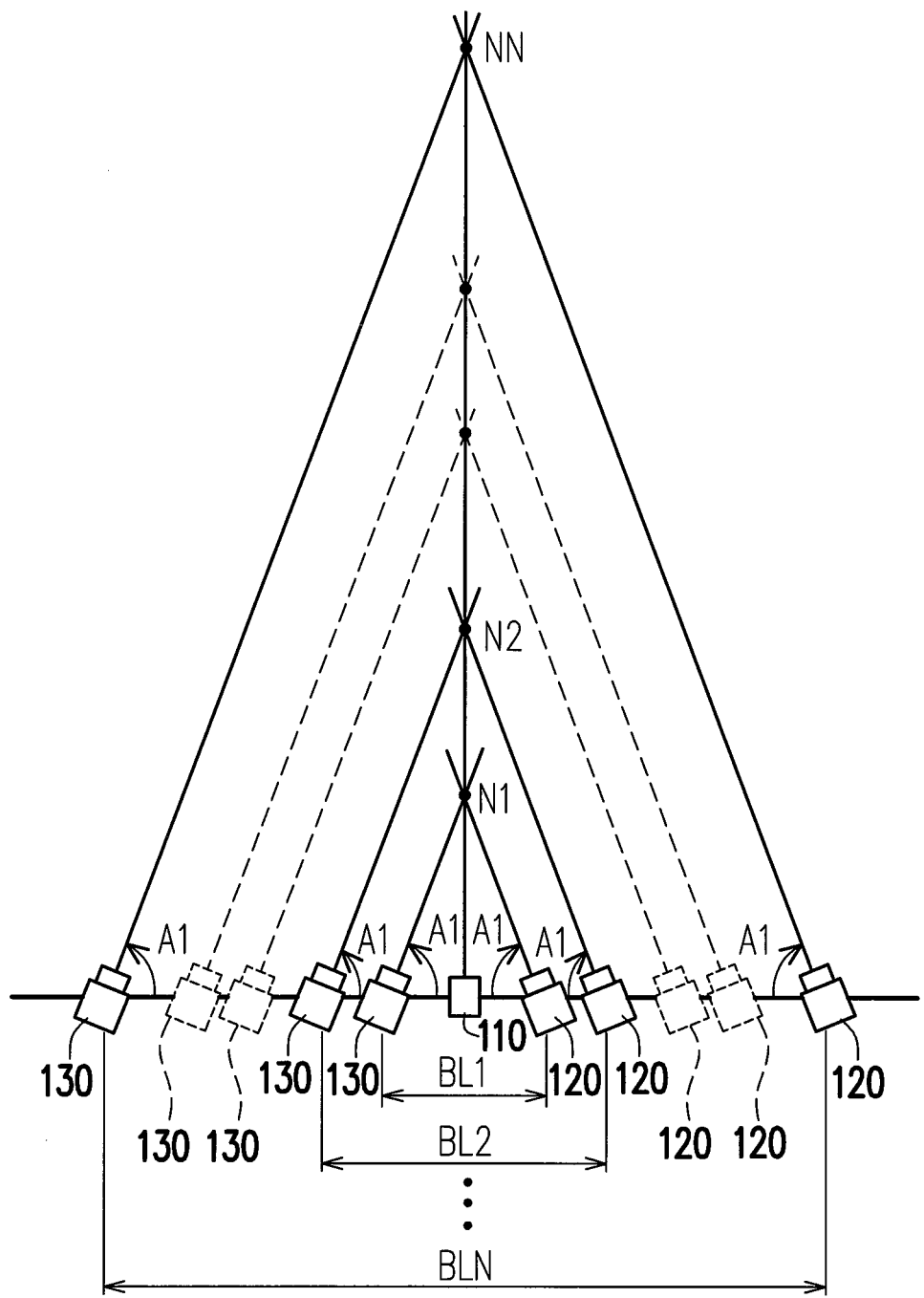
FIG. 8 is a schematic diagram of adjusting baseline distances between a first and a second image sensing devices to adjust a measuring position of the depth image acquiring device.
Figure 10:
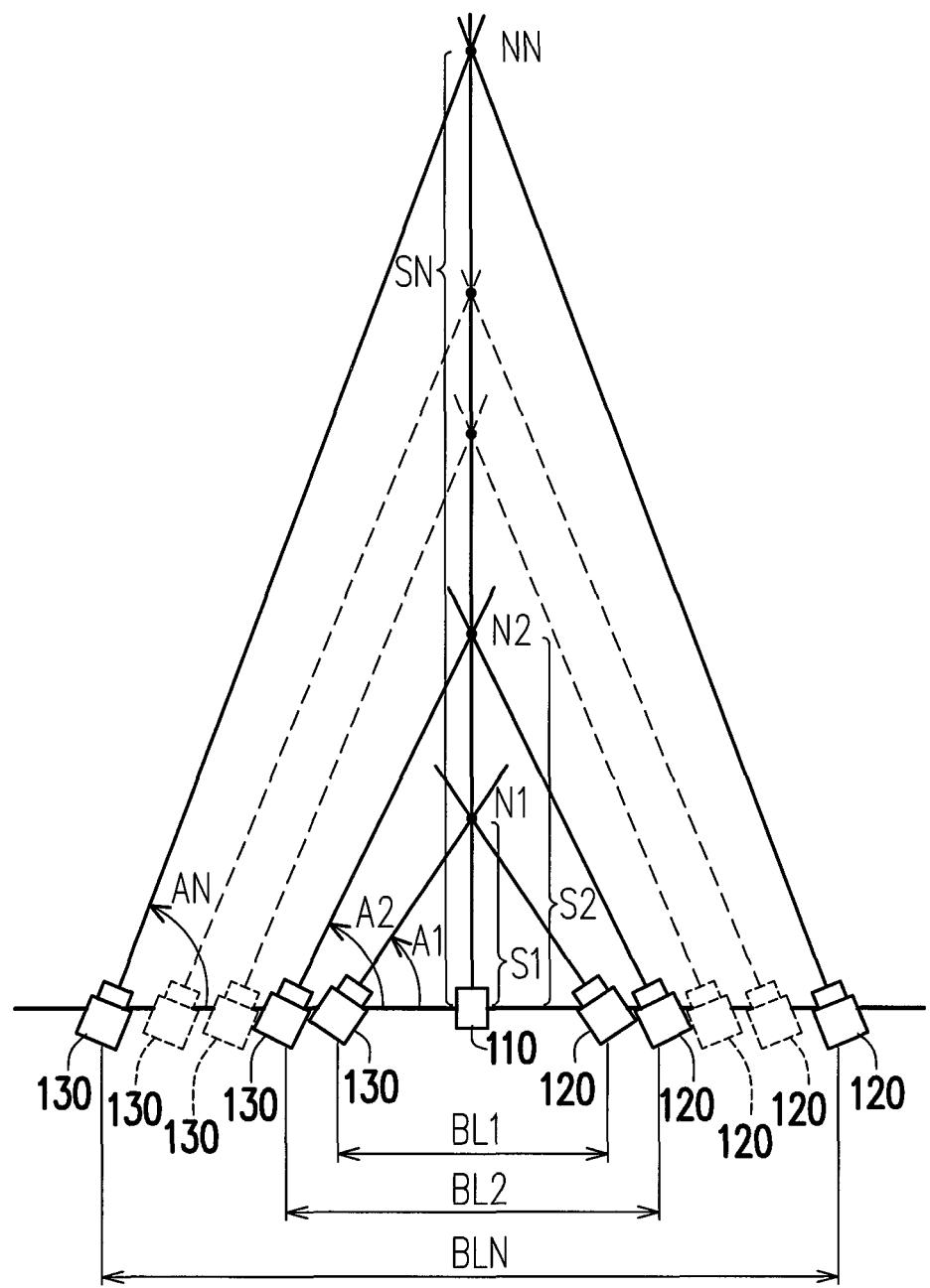
FIG. 10 is a schematic diagram of adjusting baseline distances and convergence angles of a first and a second image sensing devices to adjust a measuring position of the depth image acquiring device.

In FIG. 7, the mechanism device 140 includes the first and the second carrying members 310 and 312, the screw 440 having the first region 442 and the second region 444, the first and the second rotating components 510 and 512 and the motor 330. The structure and actuation method of the screw 440 of FIG. 7 are similar to that of the screw 440 of FIG. 4, which can all be used to adjust the baseline distance between the first and the second image sensing devices 120 and 130, and details thereof are not repeated. It should be noticed that a rotation shaft 710 of the first rotating component 510 includes a non-circular cross-section long groove accommodating space 720 with an opening facing towards a rotation shaft 712 of the second rotating component 512. The rotation shaft 712 of the second rotating component 512 includes a loose transmission member 730 protruding corresponding to the non-circular cross-section long groove accommodating space 720, such that when the rotation shaft 710 of the first rotating component 510 is driven by the motor to rotate, the rotation shaft 710 drives the rotation shaft 712 of the second rotating component 512, so as to simultaneously adjust the convergence angles of the first and the second image sensing devices 120 and 130 (shown as dot line arrows 550). FIG. 10 is a schematic diagram of adjusting baseline distances and convergence angles of the first and the second image sensing devices 120 and 130 to adjust a measuring position of the depth image acquiring device 100. Therefore, after the depth image acquiring device 100 uses the mechanism device 140 of FIG. 7, the processing unit 150 of FIG. 1 can dynamically adjust the baseline distances BL1-BLN and the convergence angles A1-AN of the first and the second image sensing devices 120 and 130 to adjust the measuring nodes N1-NN.

Referring back to FIG. 1, based on the depth image acquiring device 100 disclosed above, the internal of the processing unit 150 is required to have multiple functions to automatically calibrate a plurality of parameters of various components in the depth image acquiring device 100. For example, the processing unit 150 of FIG. 1 includes a lens control unit 152, a projection and image capturing unit 154 and a depth image processing unit 156. The lens control unit 152 includes a baseline distance control module 190, a convergence angle control module 191 and a zoom control module 192. The projection and image capturing unit 154 may include a projection control module 193, an image capturing control module 194. The depth image processing unit 156 may include an image processing module 195 and a depth calculation module 196, though the disclosure is not limited thereto.

The baseline distance control module 190, the convergence angle control module 191 and the zoom control module 192 are respectively used to control and adjust the baseline distances between the first and the second image sensing devices 120 and 130, the convergence angles and the focal lengths thereof. The projection control module 193 is used to control corresponding operations of the projecting device 110, and the image capturing control module 194 is used to control related parameters of image fetch of the first and the second image sensing devices 120 and 130 and synchronize an image fetch time. The image processing module 195 and the depth calculation module 196 are used to perform image processing to obtain the depth information of the measured object 160. The lens control unit 152, the projection and image capturing unit 154, the depth image processing unit 156 and the modules 190-196 therein can be implemented by hardware chips, firmware chips and software driving programs in collaboration with the processing unit 150 having the operation function.

Since when the zoom type image sensing devices 120 and 130 are used to implement the depth image acquiring device 100, variables required to be considered are large in quantity and complicated. Therefore, the disclosure provides a calibrating method and a measuring method complied with the hardware structure of the aforementioned depth image acquiring device 100, by which the predetermined single model focal length is taken as a reference in collaboration with a plurality of predetermined node distances corresponding to the model focal length to integrate variables such as the lens focal length, a lens focus position and relative positions/convergence angles of dual cameras, etc. in a simple way for each of the image sensing devices (for example, the image sensing devices 120 and 130 of FIG. 1), so as to greatly simplify a design and operation of the depth image acquiring device 100.

Generally, when the depth image acquiring device that uses the zoom type image sensing device performs an actual measurement, a series of setting operations has to be performed in advance, and then the measurement is started. First, relative positions and convergence angles of the two zoom type image sensing devices are adjusted to comply the measuring distance with a measuring range specified by the user. Then, the focal lengths of the two zoom type image sensing devices are adjusted to change fields of view of the cameras, such that measurement precision can be complied with the user's requirement. Finally, focus positions of the two camera lenses are adjusted to the required measuring distance to obtain a best measuring effect.

The above setting operations are mainly used to adjust four types of parameters (camera positions, camera angles, lens focal lengths and focus positions, which are referred to as a image setting parameter set) of the two zoom type image sensing devices. In the conventional calibrating method, variations of these parameters may influence the other parameters of the depth image acquiring device 100, and the influence has to be taken into consideration for accurate measurement. The conventional measuring method has to be integrated with complicated parameter setting operation and system calibration to perform the depth measurement process.

As shown in FIG. 1, the baseline positions and the convergence angles of the two image sensing devices 120 and 130 determine the measuring distance. Moreover, in an actual measuring application, the user generally specifies the required measuring position directly other than indirectly specifies the baseline positions and the convergence angles of the two image sensing devices 120 and 130. Therefore, when the calibrating method and the measuring method of the depth image acquiring device 100 are designed, the measuring distance is taken as a reference basis, and the setting, calibrating and measuring of the depth image acquiring device 100 are all directly associated to the measuring distance. In a image setting parameter set (camera positions, camera angles, lens focal lengths and focus positions), lens focal lengths are relative to the field of view of the depth image acquiring device 100, and the other parameters are relative to the measuring distance. Therefore the lens focal lengths are independent from the other parameters, and can be isolated.

Therefore, in the calibrating method and the measuring method of the disclosure, each of the zoom type image sensing devices is first set to the respective model focal length, and then a plurality of predetermined node distances are selected to serve as reference basis. For each node distance, an image setting parameter sets is specified and recorded. The image setting parameter sets will be used to implement the calibration and measurement processes of the depth image acquiring device 100. In this way, the depth image acquiring device 100 is unnecessary to repeatedly adjust the baseline distances, the convergence angles and the focal lengths of the image sensing devices 120 and 130 in the calibration and measurement processes, but directly uses the predetermined model focal length and the predetermined node distances to obtain reference data. When the depth image acquiring device 100 performs calibration, the image sensing devices are set to the respective model focal lengths, and states of the cameras are set according to the image setting parameter set of each of the nodes. Each of the nodes is individually calibrated to obtain the respective 3D measuring parameter set to perform a 3D or depth calculation. In other words, when the measurement is performed, the user specifies a measuring distance, and specifies a measuring focal length of the image sensing device according to a required measurement resolution. The specified measuring distance is compared with the node distances, and a table lookup operation or an interpolation operations can be performed on the image setting parameter set and the 3D measuring parameter set of each node to obtain a new image setting parameter set and 3D measuring parameter set suitable for the image sensing devices 120 and 130 and located at the required measuring distance. The image coordinate conversion is performed to convert image coordinates obtained in measuring focal length to equivalent coordinates corresponding to the model focal length. In this way, the 3D measuring parameter set calibrated according to the model focal length can be used to perform the 3D/depth calculation.

A relationship between camera focal length and the viewing angle range of the zoom type image sensing device is described blow. When the focal length of the zoom type image sensing device is changed, the field of view of the zoom type image sensing device is accordingly changed, and in the perspective of mathematics, the image coordinates are changed. Thus, the operation of changing focal length is equivalent to conversion of the image coordinates. It is assumed that the model focal length of the selected zoom type image sensing device is f0, and (X0, Y0) is image coordinates of any point of any actual image before image conversion, and when the focal length of the zoom type image sensing device is changed to a specified focal length fi, the point (X0, Y0) of any actual image is changed to a point (Xi, Yi), namely, (Xi, Yi) are the image coordinates of the corresponding point (X0, Y0) after image conversion. A image conversion relationship between the point (X0, Y9) and the point (Xi, Yi) is shown as a following equation (1):

$$\begin{cases} Xo = F_x(Xi, Yi, fi, f0) \\ Yo = F_y(Xi, Yi, fi, f0) \end{cases} \quad (1)$$

If the zoom lens of the image sensing device is perfect, which does not cause image offset and distortion during a zooming process, the image conversion relationship can be defined as a following equation (2):

$$\begin{cases} X0 = \alpha i(Xi - Cx) + Cx \\ Y0 = \alpha i(Xi - Cy) + Cy \end{cases} \quad (2)$$

Where, a point (Cx, Cy) is an image center of the image sensing device, and such value can be obtained according to the conventional calibrating method of the image sensing device. $\alpha i$ is a ratio factor of image zooming, and is also referred to as a zooming constant, which can be calculated according to a variation ratio of the focal length, and can also be estimated according to the actual image. If the zoom lens is not perfect and may cause image offset and distortion, the equation (1) can be designed according to an actual requirement. It should be noticed that when the camera is changed from the model focal length f0 to any focal length fi, a correct or similar conversion equation can be designed to convert the point (Xi, Yi) of any image position to the image position (X0, Y0) corresponding to the model focal length f0, and the image sensing devices respectively have their own conversion equations.

Therefore, when the zoom depth image acquiring device 100 is calibrated, the image sensing device will be fixed to a specified model focal length f0. When the depth image acquiring device 100 performs the measurement via the specified focal length fi, the aforementioned method can be used to generate the conversion equation for the image coordinates, so as to convert the required image position to the image coordinates corresponding to the specified focal length f0, and in collaboration with the 3D measuring parameter sets of the depth image acquiring device 100, the depth information can be measured.

Figure 11:
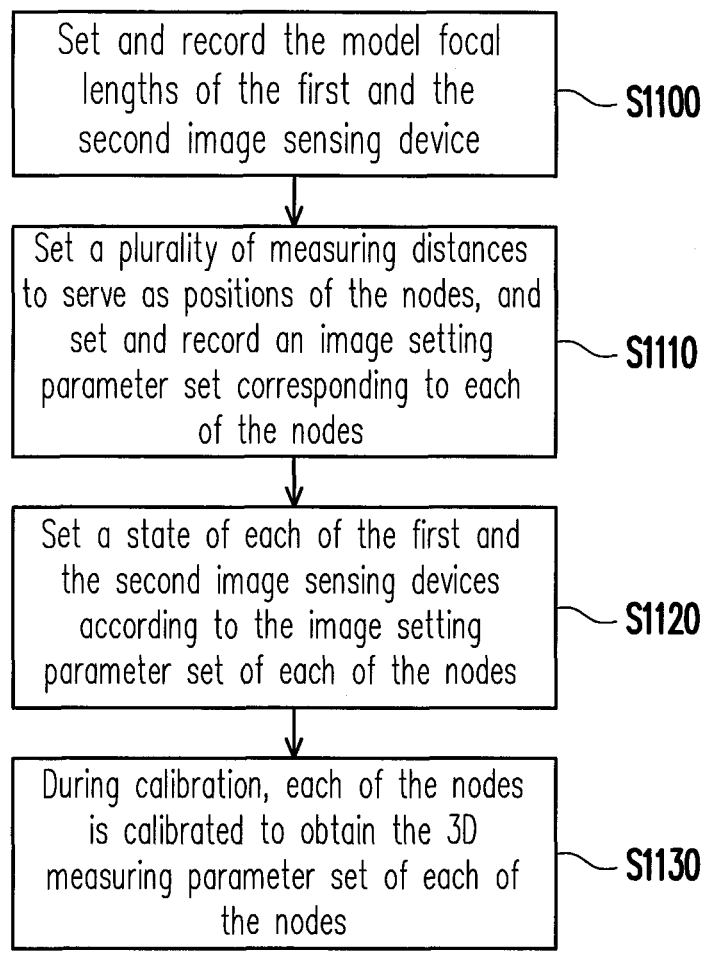
FIG. 11 is a flowchart illustrating a calibrating method of the depth image acquiring device according to an embodiment of the disclosure.

FIG. 11 is a flowchart illustrating a calibrating method of the depth image acquiring device 100 according to an embodiment of the disclosure. Referring to FIG. 1, FIG. 10 and FIG. 11, in step S1100, the processing unit 150 respectively set the focal length of the first and the second image sensing devices 120 and 130 to the corresponding model focal length f0. The processing unit 150 can respectively select different focal lengths to serve as the model focal lengths of the image sensing devices 120 and 130 according to the focal length range and of the image sensing devices 120 and 130 and the manufacture predetermined settings, etc. Namely, the image sensing devices 120 and 130 may select the focal lengths of different lengths to respectively serve as the predetermined model focal lengths of the image sensing devices 120 and 130. For example, when one of the image sensing devices is an virtual image sensing device implemented by the projecting device, a zooming range thereof is probably different to that of an actual image sensing device, and even that the virtual image sensing device is implemented by a fixed focus length lens.

A reason of only selecting a single model focal length for each of the image sensing devices is that if multiple model focal lengths are selected for each of the image sensing devices, the aforementioned image conversion equation for the model focal length is more complicate. In order to simplify the calibrating method of the disclosure, only a single model focal length is selected for each of the image sensing devices. In other embodiments, the two image sensing devices 120 and 130 may also select a plurality of model focal lengths to serve as one set of model focal lengths respectively.

In the step S1110, the processing unit 150 sets a plurality of node distances S1-SN in advance to serve as positions of a plurality of nodes N1-NN in FIG. 10, and sets an image setting parameter set corresponding to each of the nodes N1-NN. The predetermined node distances S1-SN are shown in FIG. 10, and the measuring nodes N1-NN in FIG. 10 respectively correspond to each of the predetermined node distances S1-SN. Regarding setting of the aforementioned model focal lengths and the predetermined node distances, better reference data can be obtained through experiments, which can be set according to an actual situation or according to user's demand, and is not limited by the disclosure. For example, the processing unit can use a middle value of the zooming range of each of the image sensing devices 120 and 130 to serve as the model focal length f0 of the image sensing devices 120 and 130.

After the processing unit 150 sets the image sensing devices 120 and 130 to the model focal length f0, the processing unit 150 takes the node distances S1-SN as references to record data of each node according to the selected predetermined nodes (i.e. the N nodes N1-NN). The data is, for example, a predetermined node distance Si, a baseline distance (BLi), a convergence angle (Ai) and a focus position Ci of the first and the second image sensing devices 120 and 130 corresponding to the predetermined node distance Si, which serves as reference data generated by the calibrating method, and the reference data is used in subsequent measurement. The image setting parameter set of the present embodiment or the subsequent disclosed 3D measuring parameter set include the aforementioned baseline distance BLi, the convergence angle Ai and/or the focus position Ci. The image setting parameter set of the present embodiment or the subsequent disclosed 3D measuring parameter set may further include corresponding 3D parameters.

In the step S1120, the processing unit 150 respectively sets the image sensing devices 120 and 130 to the respective model focal lengths, and sets a state of each of the image sensing devices 120 and 130 according to the image setting parameter set of each of the nodes N1-NN. In step S1130, when the calibration is performed to the depth image acquiring device 100, the processing unit 150 individually calibrates each of the nodes to obtain the 3D measuring parameter set of each of the nodes, and the 3D measuring parameter sets are used in 3D measuring calculation.

The calibrating method of the depth image acquiring device 100 is not limited by the disclosure, and those skilled in the art can use related calibration techniques to obtain the aforementioned 3D measuring parameter sets. In the calibrating method of the disclosure, accurate mechanism positioning is not required, and as long as the image setting parameter set obtained in the step S1120 is used at each of the nodes N1-NN to set the state of the depth image acquiring device 100 and has high reproducibility, the accurate depth image measuring result is obtained.

Figure 12:
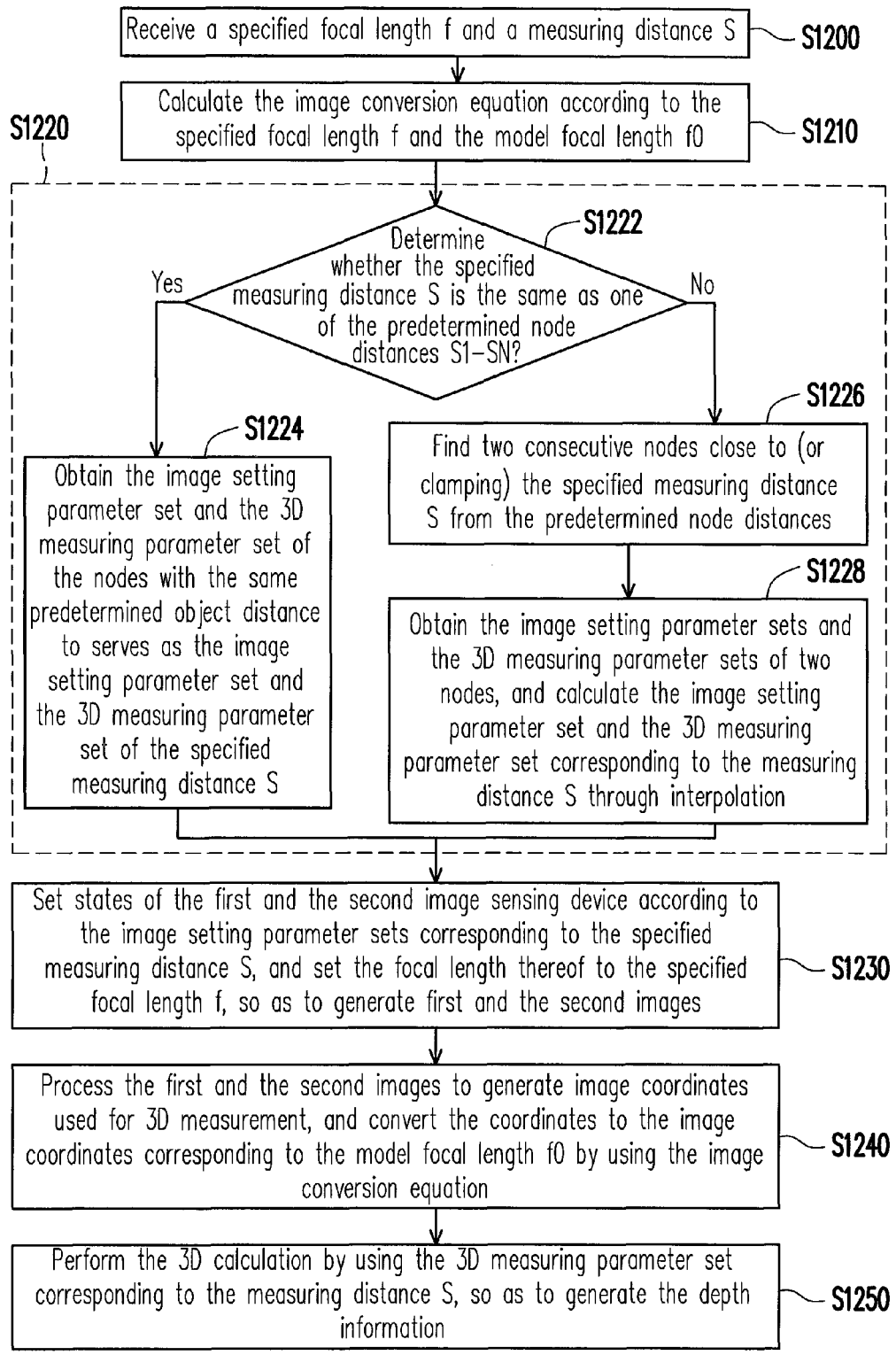
FIG. 12 is a flowchart illustrating a measuring method of the depth image acquiring device according to an embodiment of the disclosure.

FIG. 12 is a flowchart illustrating a measuring method of the depth image acquiring device 100 according to an embodiment of the disclosure. After the calibrating method of FIG. 11, the aforementioned measuring distance, the image setting parameter sets and the 3D measuring parameter sets can be used to assist the measuring method of the disclosure, and the desired setting parameters of the image sensing devices 120 and 130 and 3D image conversion relationship parameters can be quickly obtained. In step S1200, the processing unit 150 receives a specified focal length f and a specified measuring distance S specified by the user or from external. Based on a ratio between the specified focal length f and the model focal length f0, a ratio of measuring areas corresponding to the specified focal length f and the model focal length f0 is determined. The specified measuring distance S is obtained by intuitively specifying the measuring distance. In the present embodiment, since a resolution of the depth measurement is directly related to the specified focal length f, the processing unit 150 can use the resolution parameter received from external in collaboration with a table lookup method to convert the aforementioned resolution parameter to the corresponding specified focal length f.

In step S1210, the processing unit 150 calculates the image conversion equation according to the specified focal length f and the model focal length f0, and related disclosure has been described above, so that details thereof are not repeated. In step S1220, the processor unit 150 compares the specified measuring distance S with the predetermined node distances S1-SN to calculate the image setting parameter sets and the 3D measuring parameter sets of the first and second image sensing devices 120 and 130 at the specified measuring distance S. In detail, in step S1222, it is determined whether the specified measuring distance S is the same as one of the predetermined node distances S1-SN. If the specified measuring distance S is the same as a predetermined node distance Si ($1 \leq i \leq N$), a step S1224 is executed to obtain the image setting parameter set and the 3D measuring parameter set of the predetermined node distance Si (corresponding to a measuring node Ni). In other words, in the steps S1222-S1224, the measuring distance S is compared with the predetermined node distances in collaboration with a table lookup method to obtain setting data (the image setting parameter sets) and the measuring data (the 3D measuring parameter sets) of the image sensing devices 120 and 130.

If the specified measuring distance S is not the same as any one of the predetermined node distances S1-SN, the processing unit 150 finds two consecutive nodes close to (or clamping) the specified measuring distance S from the predetermined node distances S1-SN (for example, the specified measuring distance S is located between the nodes N1 and N2) (step S1226). In step S1228, the processing unit 150 obtains the image setting parameter sets and the 3D measuring parameter sets corresponding to the predetermined node distances S1 and S2, and calculates the image setting parameter set and the 3D measuring parameter set corresponding to the measuring distance S through interpolation, so as to set the states of the image sensing devices 120 and 130, such that the measuring distance is complied with the specified measuring distance S, and the obtained 3D measuring parameter set is used to perform the 3D image calculation or depth measurement calculation.

In step S1230, the processing unit 150 sets the first and the second image sensing devices 120 and 130 according to the image setting parameter sets corresponding to the specified measuring distance S, where the first and the second image sensing devices 120 and 130 respectively sense the projection pattern projected to the measured object 160 under control of the processing unit 150, so as to generate the first and the second real images 170 and 171.

In step S1240, the depth image acquiring device 100 is used to process the first and the second real images 170 and 171 to generate related image data and then use the generated image data to calculate 3D coordinates. The actual measuring method is not limited by the disclosure, and the spirit of the disclosure is met as long as the image data used for calculating the 3D coordinates is generated. For example, an image is obtained from each of the two cameras, and the two images are rectified to find image corresponding points. The corresponding 3D coordinates can be calculated according to the image coordinates of the image corresponding points. Then, the coordinates of the image data generated during the above mentioned procedure is converted by using the image conversion equation, such that the coordinates of the image are converted to the image coordinates corresponding to the model focal length f0. Then, the 3D coordinates are calculated by using the 3D parameters, so as to generate a depth map. The depth map is one of description manners of 3D data, and other description manners can also be used, for example, to output 3D triangular meshes.

In step S1250, the processing unit 150 performs the 3D calculation by using the converted image data resulting from the first and the second real images 170 and 171 and using the 3D measuring parameter set corresponding to the measuring distance S, such that the depth image acquiring device 100 generates the depth information. In the present embodiment, the second image sensing device 130 can also be a virtual image sensing device (for example, the projecting device) suitable for producing a virtual image.

In summary, the depth image acquiring device of the disclosure uses the zoom type image sensing devices and the projecting device to perform depth image measurement with active light projection, and uses the mechanism device to dynamically adjust distances and/or convergence angles between the image sensing devices, so as to automatically adjust locations and/or convergence angles of the zoom type image sensing devices, such that the depth image acquiring device of the disclosure is capable of automatically adjusting an image acquiring range thereof and adjusting a resolution of an acquired image. Moreover, the disclosure also provides the calibrating method and the measuring method of the depth image acquiring device, by which the predetermined model focal lengths and the predetermined node distances are used to determine the image setting parameter sets and the 3D measuring parameter sets of the zoom type image sensing devices, which are used in the following depth image sensing. Therefore, the complicated calibration and measuring procedures required by the zoom type image sensing device are simplified, so as to decrease difficulty in design and operation of the depth image acquiring device.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A depth image acquiring device, comprising:
    at least one projecting device, projecting a projection pattern to a measured object;
    a first and a second image sensing devices, receiving focal length adjusting signals to adjust focal lengths thereof, and respectively sensing the projection pattern projected to the measured object to generate a first real image and a second real image;
    a mechanism device, coupled to the first and the second image sensing devices, and receiving lens adjusting signals to adjust locations and/or convergence angles of the first and the second image sensing devices;
    a processing unit, coupled to the at least one projecting device, the first and the second image sensing devices and the mechanism device, providing the focal length adjusting signals and the lens adjusting signals to adjust the focal lengths, locations and/or convergence angles of the first and the second image sensing devices, and performing a depth operation on the first and the second real images to generate depth information,
    wherein the processing unit calibrates and obtains a three-dimensional (3D) measuring parameter set of the first and the second image sensing devices at a model focal length according to a plurality of image setting parameter sets corresponding to the model focal length and a plurality of predetermined node distances corresponding to each of the image sensing devices, and accordingly performs a depth operation.

2. The depth image acquiring device as claimed in claim 1, wherein the processing unit respectively sets the focal lengths of the first and the second image sensing devices to the corresponding model focal length,
    sets a plurality of node distances to serve as positions of a plurality of nodes,
    sets the image setting parameter set corresponding to each of the nodes,
    during calibration, the processing unit sets the first and the second image sensing devices to the respective model focal lengths, and sets states of the first and the second image sensing devices according to the image setting parameter set of each of the nodes, and performs calibration on each of the nodes to obtain the respective 3D measuring parameter sets of each of the nodes, wherein the 3D measuring parameter sets are used to perform 3D measuring calculation.

3. The depth image acquiring device as claimed in claim 2, wherein the image setting parameter sets or the 3D measuring parameter sets comprise baseline distances, convergence angles and/or focus positions of the first and the second image sensing devices.

4. The depth image acquiring device as claimed in claim 2, wherein the processing unit selects different focal lengths for the first and the second image sensing devices to serve as the model focal lengths.

5. The depth image acquiring device as claimed in claim 2, wherein the processing unit selects focal lengths within a zooming range of the first and the second image sensing devices to serve as the model focal lengths.

6. The depth image acquiring device as claimed in claim 1, wherein the processing unit receives a specified focal length and a specified measuring distance,
    compares the specified measuring distance with the corresponding node distances to calculate the image setting parameter set and the 3D measuring parameter set of the first and the second image sensing devices at the specified focal length,
    sets the first and the second image sensing devices according to the image setting parameter set of the specified focal length, wherein the first and the second image sensing devices respectively sense the projection pattern projected to the measured object, so as to generate the first and the second real images,
    the processing unit calculates an image conversion equation according to the specified focal length and the model focal length, and
    converts the first and the second real images according to the image conversion equation and calculates according to the 3D measuring parameter set of the specified focal length, so as to generate the depth information.

7. The depth image acquiring device as claimed in claim 1, wherein the depth information is a depth image, 3D image coordinates or a depth image distribution map.

8. The depth image acquiring device as claimed in claim 1, wherein the at least one projecting device serves as a virtual image sensing device, and an original image of the projection pattern is taken as a virtual image, wherein the processing unit performs the depth operation on the first and the second real images and the virtual image to generate the depth information.

9. The depth image acquiring device as claimed in claim 1, wherein the at least one projecting device comprises:
    a light source, sending a projection beam; and
    a projection pattern generation device, disposed on an optical path of the light source, and irradiated by the light source to generate the projection pattern.

10. The depth image acquiring device as claimed in claim 9, wherein the light source is a laser light source, an infrared light source, an ultraviolet light source, a visible light source or a light emitting diode light source.

11. The depth image acquiring device as claimed in claim 9, wherein the projection pattern generation device is a diffractive optical device or a frosted glass device.

12. The depth image acquiring device as claimed in claim 9, wherein the at least one projecting device further comprising:
a projecting lens, disposed on an optical path of the projection pattern generation device, and projecting the projection pattern generated by the light source through the projection pattern generation device to the measured object.

13. The depth image acquiring device as claimed in claim 12, wherein the projecting lens is a zoom lens or a fixed focal length lens.

14. The depth image acquiring device as claimed in claim 13, wherein when the projecting lens is the zoom lens, the processing unit provides the focal lens adjusting signals to synchronously adjust focal lengths of the projecting lens and the first and the second image sensing devices.

15. The depth image acquiring device as claimed in claim 1, wherein the projection pattern is pre-designed or randomly generated pattern, or a randomly distributed stray light spot pattern.

16. The depth image acquiring device as claimed in claim 1, wherein the first and the first and the second image sensing devices respectively comprise:
a zoom lens, receiving the focal length adjusting signal to adjust a focal length thereof; and
an image sensor, sensing the projection pattern projected to the measured object through the zoom lens.

17. The depth image acquiring device as claimed in claim 16, wherein when the light source of the at least one projecting device is a light source with a specific wavelength, the first and the second image sensing devices respectively comprise:
an optical filter, disposed on an optical path of the zoom lens, wherein the optical filter matches the specific wavelength and is pervious to light beams with the specified wavelength and filters the other light beams.

18. The depth image acquiring device as claimed in claim 1, wherein the mechanism device comprises:
a first and second carrying members, respectively carrying the first and the second image sensing devices;
a first and second rotating components, respectively adjusting the convergence angles of the first and the second image sensing devices; and
a shifting member, connected to the first and the second carrying members to adjust a baseline distance between the first and the second image sensing devices.

19. The depth image acquiring device as claimed in claim 18, wherein the shifting member comprises:
a screw, comprising a first region and a second region having threads of a first direction and a second direction, wherein the first region and the second region are respectively connected to the first and the second carrying members, and when the screw rotates, the first and the second carrying members move relative to each other along the screw.

20. The depth image acquiring device as claimed in claim 18, wherein a rotation shaft of the first rotating component comprises a non-circular cross-section long groove accommodating space with an opening facing towards a rotation shaft of the second rotating component, and the rotation shaft of the second rotating component comprises a loose transmission member protruding corresponding to the non-circular cross-section long groove accommodating space, such that when the rotation shaft of the first rotating component rotates, the rotation shaft drives the rotation shaft of the second rotating component, so as to simultaneously adjust the convergence angles of the first and the second image sensing devices.

21. The depth image acquiring device as claimed in claim 18, wherein the shifting member comprises:
a first and second screws, respectively connected to the first and the second carrying members, wherein the first and the second carrying members respectively move along the first and the second screws.

22. A depth image acquiring device, comprises:
at least one projecting device, projecting a projection pattern to a measured object, wherein the at least one projecting device serves as a virtual image sensing device, and an original image of the projection pattern is taken as a virtual image;
at least one image sensing device, receiving a focal length adjusting signal to adjust a focal length thereof, and sensing the projection pattern projected to the measured object to generate at least one real image;
a mechanism device, coupled to the at least one image sensing device, and receives a lens adjusting signal to adjust a location and/or a convergence angle of the at least one image sensing device;
a processing unit, coupled to the at least one projecting device, the at least one image sensing device and the mechanism device, providing the focal length adjusting signal and the lens adjusting signal to adjust the focal length, the location and/or the convergence angle of the at least one image sensing device, and performing a depth operation on the at least one real image and the virtual image to generate depth information,
wherein the processing unit calibrates and obtains a three dimension (3D) measuring parameter set of the at least one image sensing device at a model focal length according to a plurality of image setting parameter sets corresponding to a model focal length and a plurality of predetermined node distances corresponding to each of the image sensing devices, and accordingly performs the depth operation.

23. The depth image acquiring device as claimed in claim 22, wherein the processing unit respectively sets the focal length of the at least one image sensing device to the corresponding model focal length,
sets a plurality of node distances to serve as positions of a plurality of nodes,
sets the image setting parameter set corresponding to each of the nodes,
during calibration, the processing unit sets the at least one image sensing device to the respective model focal lengths, and sets a state of the at least one image sensing device according to the image setting parameter set of each of the nodes, and performs calibration on each of the nodes to obtain the respective 3D measuring parameter sets of each of the nodes, wherein the 3D measuring parameter sets are used to perform 3D measuring calculation.

24. The depth image acquiring device as claimed in claim 23, wherein the image setting parameter set or the 3D measuring parameter set comprises baseline distances, convergence angles and/or focus positions of the at least one image sensing device and the at least one projecting device.

25. The depth image acquiring device as claimed in claim 23, wherein the processing unit selects different focal lengths for the at least one image sensing device to serve as the model focal lengths.

26. The depth image acquiring device as claimed in claim 23, wherein the processing unit selects focal lengths within a zooming range of the at least one image sensing device to serve as the model focal lengths.

27. The depth image acquiring device as claimed in claim 22, wherein the processing unit receives a specified focal length and a specified measuring distance, compares the specified measuring distance with the corresponding predetermined node distances to calculate the image setting parameter set and the 3D measuring parameter set of the at least one image sensing device at the specified focal length, sets the at least one image sensing device according to the image setting parameter set of the specified focal length, wherein the at least one image sensing device respectively senses the projection pattern projected to the measured object, so as to generate the at least one real image, the processing unit calculates an image conversion equation according to the specified focal length and the model focal length, and converts the at least one real image and the virtual image according to the image conversion equation and calculates according to the 3D measuring parameter set of the specified focal length, so as to generate the depth information.

28. A calibrating method of a depth image acquiring device, wherein the depth image acquiring device comprises at least one projecting device, at least one image sensing device and a mechanism device, the at least one projecting device projects a projection pattern to a measured object, wherein the at least one projecting device serves as a virtual image sensing device, the at least one image sensing device senses the projection pattern projected to the measured object to generate at least one real image, the mechanism device adjusts a location and/or a convergence angle of the at least one image sensing device, and the depth image acquiring device performs a depth operation on the at least one real image to generate depth information, the calibrating method of the depth image acquiring device comprising:

respectively setting the at least one image sensing device to a model focal length;

setting a plurality of node distances to serve as locations of a plurality of nodes;

setting an image setting parameter set corresponding to each of the nodes;

setting the at least one image sensing device to the respective focal length, setting a state of the at least one image sensing device according to the image setting parameter set of each of the nodes; and calibrating each of the nodes to obtain a 3D measuring parameter set of each of the nodes, wherein the 3D measuring parameter set is used to perform a 3D measuring calculation.

29. The calibrating method of the depth image acquiring device as claimed in claim 28, wherein the image setting parameter set or the 3D measuring parameter set comprises baseline distances, convergence angles and/or focus positions of the at least one image sensing devices.

30. The calibrating method of the depth image acquiring device as claimed in claim 28, wherein the model focal lengths are different according to a zooming range setting of the at least one image sensing device.

31. The calibrating method of the depth image acquiring device as claimed in claim 28, wherein each of the model focal lengths is a focal length within a zooming range of the at least one image sensing device.

32. The calibrating method of the depth image acquiring device as claimed in claim 28, wherein the 3D measuring calculation comprises:

receiving the specified focal length and the specified measuring distance;

comparing the specified measuring distance with the corresponding predetermined node distances to calculate the image setting parameter set and the 3D measuring parameter set of the at least one image sensing devices at the specified focal length;

setting a state of the at least one image sensing device according to the image setting parameter set of the specified focal length, wherein the at least one image sensing device respectively senses the projection pattern projected to the measured object, so as to generate the at least one real image;

calculating an image conversion equation according to the specified focal length and the model focal length; and converting the at least one real image according to the image conversion equation and calculating according to the 3D measuring parameter set to generate the depth information.

33. A measuring method of a depth image acquiring device, wherein the depth image acquiring device comprises at least one projecting device, at least one image sensing device and a mechanism device, the at least one projecting device projects a projection pattern to a measured object, wherein the at least one projecting device serves as a virtual image sensing device, the at least one image sensing device senses the projection pattern projected to the measured object to generate at least one real image, the mechanism device adjusts a location and/or a convergence angle of the at least one image sensing device, and the depth image acquiring device performs a depth operation on the at least one real image to generate depth information, the measuring method of the depth image acquiring device comprising:

receiving a specific focal length and a specific measuring distance, wherein the at least one image sensing device is set to have a model focal length, a plurality of node distances corresponding to locations of a plurality of nodes, an image setting parameter set and a 3D measuring parameter set corresponding to each of the nodes;

comparing the specified measuring distance with the corresponding node distances to calculate the image setting parameter set and the 3D measuring parameter set of the at least one image sensing device at the specified focal length;

setting a state of the at least one image sensing device according to the image setting parameter set of the specified focal length, wherein the at least one image sensing device senses the projection pattern projected to the measured object to generate the at least one real image;

calculating an image conversion equation according to the specified focal length and the at least one model focal length; and converting the at least one real image according to the image conversion equation, and performing calculation according to the 3D measuring parameter set of the specified focal length to generate the depth information.

34. The measuring method of the depth image acquiring device as claimed in claim 33, wherein the image conversion equation is:

$$\begin{cases} X0 = Fx(Xi, Yi, fi, f0); \\ Y0 = Fy(Xi, Yi, fi, f0) \end{cases}$$

wherein the model focal length is f0, the specified focal length is fi, the point (X0, Y0) is image coordinates of any point of the at least one real image before image conversion, and the point (Xi, Yi) is image coordinates of the corresponding point (X0, Y0) of the at least one real image after the image conversion.

35. The measuring method of the depth image acquiring device as claimed in claim 33, wherein when the at least one image sensing device does not cause image offset and distortion, the image conversion equation is:

$$\begin{cases} X0 = \alpha i(Xi - Cx) + Cx; \\ Y0 = \alpha i(Yi - Cy) + Cy \end{cases}$$

wherein the point (X0, Y0) is image coordinates of any point of the at least one real image before image conversion, the point (Xi, Yi) is image coordinates of the corresponding point (X0, Y0) of the at least one real image after the image conversion, $\alpha i$ is a zooming constant, and (Cx, Cy) is an image center of the at least one image sensing device.

* * * * *